United States Patent
Coudert et al.

(10) Patent No.: US 12,474,976 B2
(45) Date of Patent: Nov. 18, 2025

(54) COMPUTATION OF WEAKLY CONNECTED COMPONENTS IN A PARALLEL, SCALABLE AND DETERMINISTIC MANNER

(71) Applicant: Synopsys, Inc., Mountain View, CA (US)

(72) Inventors: Olivier Rene Coudert, Sunnyvale, CA (US); Krishanu Debnath, Bangalore (IN)

(73) Assignee: Synopsys, Inc., Sunnyvale, CA (US)

(*) Notice: Subject to any disclaimer, the term of this patent is extended or adjusted under 35 U.S.C. 154(b) by 503 days.

(21) Appl. No.: 17/974,412

(22) Filed: Oct. 26, 2022

(65) Prior Publication Data

US 2023/0126888 A1    Apr. 27, 2023

Related U.S. Application Data

(60) Provisional application No. 63/272,614, filed on Oct. 27, 2021.

(51) Int. Cl.
*G06F 9/52* (2006.01)
*G06F 11/07* (2006.01)

(52) U.S. Cl.
CPC .......... *G06F 9/524* (2013.01); *G06F 11/0721* (2013.01); *G06F 11/079* (2013.01)

(58) Field of Classification Search
USPC .......................................................... 716/51
See application file for complete search history.

(56) References Cited

U.S. PATENT DOCUMENTS

| | | | |
|---|---|---|---|
| 2010/0083194 A1 | 4/2010 | Bagherjeiran et al. | |
| 2010/0205126 A1* | 8/2010 | Andersen | G06F 17/10 706/13 |
| 2021/0157606 A1* | 5/2021 | Zhao | G06F 9/3009 |
| 2023/0126888 A1* | 4/2023 | Coudert | G06F 9/46 714/37 |

FOREIGN PATENT DOCUMENTS

| | | | | |
|---|---|---|---|---|
| CN | 112395795 A | * | 2/2021 | G06F 30/18 |
| KR | 20240090160 A | * | 6/2024 | G06F 16/9024 |
| WO | WO 2018/144030 A1 | | 8/2018 | |
| WO | WO-2023076417 A1 | * | 5/2023 | G06F 16/9024 |

OTHER PUBLICATIONS

PCT International Search Report and Written Opinion, PCT Application No. PCT/US2022/047924, Jan. 23, 2023, 13 pages.

* cited by examiner

*Primary Examiner* — Mohammed Alam
(74) *Attorney, Agent, or Firm* — Fenwick & West LLP

(57) ABSTRACT

Disclosed is a configuration to compute weakly connected components (WCCs) in a parallel, scalable and deterministic manner. The configuration receives an undirected original graph having vertices and edges. An undefined value is assigned to all the vertices of the graph. Thereafter, each vertex is visited and assigned a WCCID (index to identify a WCC). The visitation of vertices may determine whether there are one or more thread collisions. A collision is when two threads attempt to identify the same WCC. From these collisions a new graph may be generated, a collision graph, on which the same algorithm is iterated to compute WCCs of that collision graph. The process is iterated until no further collisions are determined. In a post process, the configuration merges the WCCIDs of the collision graphs to produce the WCCIDs of the original graph.

20 Claims, 4 Drawing Sheets

COMPUTATION OF WEAKLY CONNECTED COMPONENTS IN A PARALLEL, SCALABLE AND DETERMINISTIC MANNER

CROSS REFERENCE TO RELATED APPLICATIONS

This application claims a benefit of, and priority to, U.S. Patent Application Ser. No. 63/272,614, filed Oct. 27, 2021, the contents of which is incorporated by reference in its entirety.

TECHNICAL FIELD

The present disclosure relates to computation of weakly connected components.

BACKGROUND

Computing weakly connected components (WCCs) of an undirected graph consists of finding the maximum subsets of vertices of the graph such that any pair of vertices in a subset is reachable from each other. The WCC differs from a strongly connected component (SCC) in which a graph is directed, i.e., the edge direction is primordial.

WCC computation is a linear complexity problem, but it can take a long time to generate 100's of millions of WCCs on a 10+ billion vertices graph. This causes processing to be slowed and is difficult to scale.

SUMMARY

Disclosed is a system, a method and a computer readable storage medium comprising stored instruction to compute weakly connected components (WCCs) in a parallel, scalable and deterministic manner. The configuration receives an original undirected graph having vertices and edges. An undefined value is assigned to all the vertices of the graph. Thereafter, each vertex is visited and assigned a WCCID (index to identify a WCC). The visitation of vertices may determine whether there are one or more thread collisions. A collision is when two threads attempt to identify the same WCC. From these collisions a new graph may be generated, a collision graph, on which the same algorithm is iterated to compute WCCs of that collision graph. The process is iterated until no further collisions are determined. In a post process, the configuration merges the WCCIDs of the collision graphs to produce the WCCIDs of the original graph.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
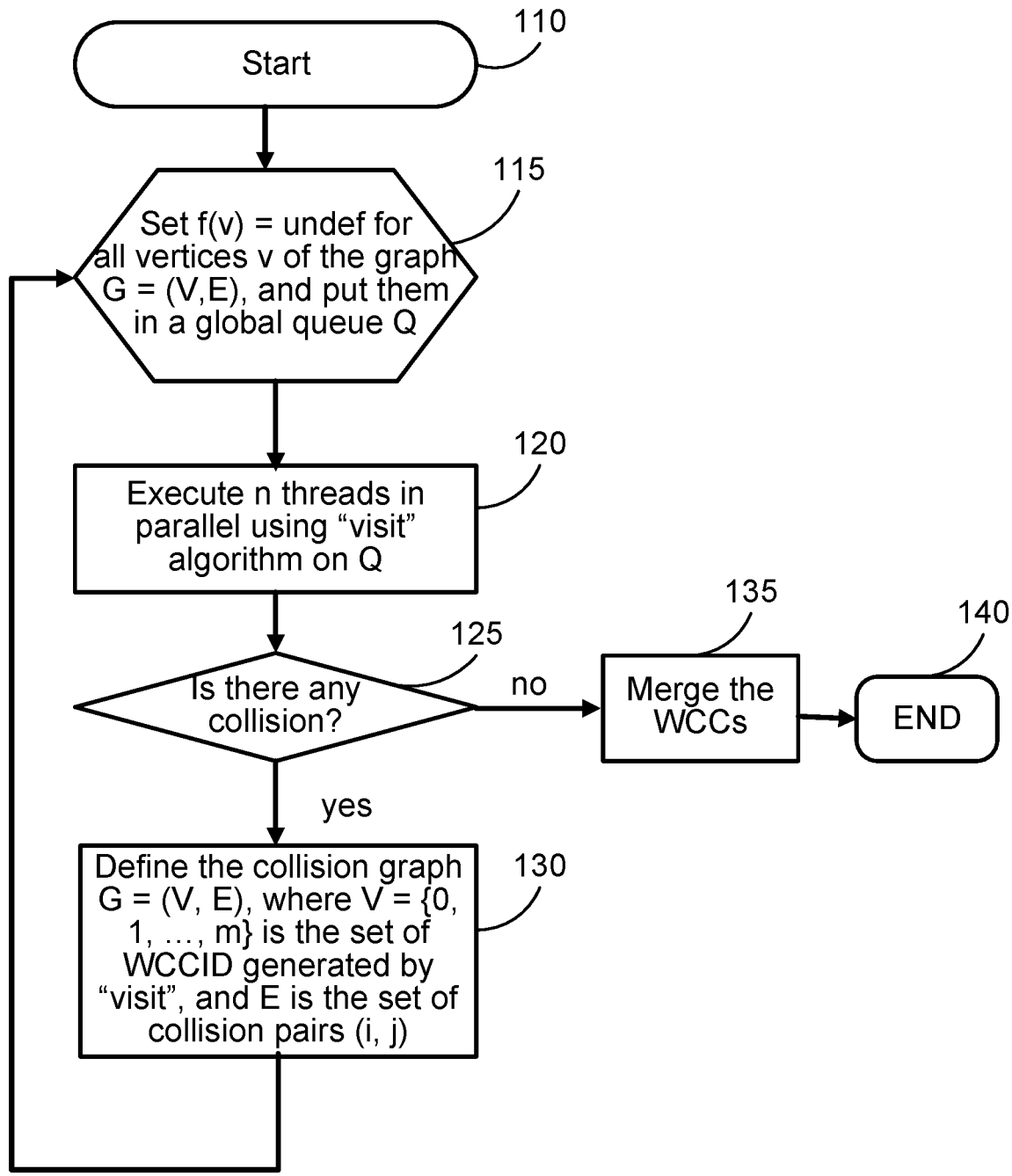
FIG. 1 illustrates the top-level flowchart of a process to compute WCCs, including defining collision graphs for the merging process, in accordance with an example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

WCC computation is used in many applications. In graph systems, WCC computation may be used to find sets of connected nodes in an undirected graph, where all nodes in the same set form a connected component. An undirected graph is bidirectional where nodes may be connected in two directions. Often WCC computation is applied as a preprocessing of a graph. Each WCC component is disconnected from the other components to then be processed separately. For example, WCC computation may be applied to keep track of clusters of database records. The WCCs may be used to measure the authority and relevance of documents by checking whether a WCC is broken when a vertex or a set of vertices with presumably high relevance is removed from the graph.

WCC computation has direct applications in electronic design automation (EDA). It is used to partition large graphs so that distributed processing can be applied. It is also used to identify clusters of nodes in a netlist, which are later used for partitioning and placement, or used for timing abstraction. In those applications, the size of the graph is in the billions of vertices and edges, and the number of WCCs is from a low 100 to 100's of millions. This can be significantly more challenging that the applications mentioned above, because of the size of the graph, and the expectation on a short computation time (a few minutes). That is, when a graph is very large and has a very large number of WCCs, processing the graph can be extremely compute resource intensive and time intensive, which may be problematic when fast computer turnaround is required.

Disclosed is a system, a method and a computer readable storage medium comprising stored instruction to compute weakly connected components (WCCs) in a parallel, scalable, and deterministic manner. With WCC, if a direction of the edges is ignored, there exists a path from every vertex in the component to every other vertex in the component. With WCC computation, the configuration receives an original undirected graph. An undefined value is assigned to all vertices of the graph. The vertices are placed in a global queue. Thereafter, a depth-first visitation is performed on each vertex in the global queue, and it is determined whether there is a collision on the visited vertices. A collision is when two threads are visiting the same vertex and attempting to put it in their own set of visited vertices, its WCC. The configuration either merges the visited vertex into an existing weakly connected component (WCCs) for the thread in response to no determined collision or generates a collision pair with the visited vertex in response to a determined collision. The configuration collects collision pairs to generate a collision graph and then iterates the steps starting with visiting the next vertex in global queue until all the vertices are visited. The configuration merges the WCCs of the collision graph and each iterated new collision graph to produce the WCCs of the original graph.

In configurations such as electronic design automation applications, graph sizes can be extremely large with a very large number of WCCs. The disclosed configuration allows for faster processing and greater scalability for EDA and other applications having very large graphs with very large numbers of WCCs.

Turning now to, by way of example, a process where there is set, V, and defined unordered_pair(V)={{u, v}|u∈V, v∈V}. An undirected graph G is a couple (V, E) of vertices V and edges E. The set of edges E is a subset of unordered_pair(V). That is, there is no direction to the edges. As described herein, it may be assumed that graphs are undirected. A subgraph of G is a graph G'=(V', E'), such that V' is included in V, and E' is included in E and unordered_pair(V'). Next, vertices v1 and v2 of graph G=(V, E) are adjacent iff (if and only if) {v1, v2}∈E. A path is a sequence of vertices v_0, v_1, . . . , v_n such that v_i and v_{i+1} are adjacent for 0<=i<n. Vertices v1 and v2 are connected if there is a path between v1 and v2. A subgraph is connected iff all its vertices are connected to each other. Being connected between vertices is an equivalence relation (i.e., symmetric, reflexive, and transitive), and the induced subgraphs of its equivalence classes are called weakly connected components (WCCs).

Continuing, a compare-and-swap (CAS) is an atomic instruction used in multithreaded applications to achieve thread synchronization without a mutex. The CAS compares the content of a memory location with a given value. Only if the values are the same, the CAS modifies the contents of that memory location to the new given value. The CAS also always returns the old value of the memory location. That is, given some variable y (i.e., memory location), executing the instruction: y.CAS(newValue, oldValue), the CAS compares the value of y to oldValue. If they are equal the CAS assigns y to newValue, otherwise it keeps the value of y unchanged. Regardless of whether y is equal to oldValue or not, the CAS always returns the old value of y.

Turning now to an electronic design automation context, a netlist represents a circuit. A netlist is made of cells and nets. A cell has input and output ports. A net is a set of ports. A net connects its output ports to its input ports. A netlist as a directed graph G=(V, E) may have V as the set of cells, and E is made of edges (v1, v2), where v1 is an output port, v2 an input port, and {v1, v2} belongs to a net. Computing WCCs in a netlist includes finding the set of cells that are transitively connected by nets, regardless of whether the nets connect to input or output ports. Finding WCCs in netlists allows for partitioning, placement, timing abstraction, and netlist partitioning for job distribution.

Computing WCCs of a graph G=(V, E) has a complexity linear with the size of the graph, i.e., is in O(|V|+|E|), where |V| is the number of vertices, and |E| is the number of edges. This may be done using depth-first search (dfs) or breath-first search (bfs) algorithms. WCC computation is equivalent to the union-find algorithm (also known as disjoint-set algorithm) and often is interchangeable. Let 'w' be the number of WCCs of graph G=(V, E). From here, each WCC may be identified with a function f: V–>[0 . . . w[, i.e., it assigns each vertex of a WCC to a unique value in {0, 1, 2, . . . , w–1}, which is a WCC index (WCCID). The function f is called the characteristic function of the WCCs because it determines which WCC each vertex belongs to. Extending the notation for clarity, f(WCC) is the WCCID value that f assigns to all vertices of the given WCC.

Using a characteristic function is significantly more memory efficient than having an explicit enumeration of each WCC. Also, a goal is for WCC computation to be done in a deterministic way, for example, as follows:

Let<be a total order on V each vertex is labelled with a number from 0 to 51 V|–1). Given a set of vertices W, we note 'min W' its minimum vertex.

From that order we define a total order on WCCs:

WCC1<WCC2 iff (if and only iff) min WCC1<min WCC2

Then, compute the characteristic function f that maps each WCC onto [0 . . . w[ such that f preserves that total order:

f(WCC1)<f(WCC2) iff WCC1<WCC2

This determinism property produces the same result (i.e., the characteristic function) regardless of how much parallelism is used.

FIG. (FIG. 1 shows the top-level flowchart of an iterative process that determines the WCCs of a graph in accordance with one embodiment. At a high level, the process starts 110 with a characteristic function, f, as defined above. The process sets 115 f(v)=undef for all vertices v of a graph G=(V, E), as the WCC that contains v is not known. The vertices are put in a global queue, Q. Later values, as described below, are assigned to f(v) so that vertices that have the same value are in the same WCC. The global queue, Q, is shared among all the processing threads, while a local queue, q, is for a specific thread.

The process executes 120 n threads in parallel and uses a visit algorithm that visits the vertices in the global queue, Q. The "visit" procedure includes performing a depth first search (dfs) to find a set of connected vertices and mark them with the same value f(v)=j. A set of connected vertices is a subset of some WCC. Note however that this set may be a strict subset of a WCC, since threads may collide on visiting the same WCC, as further described below. The visit process if further described with FIG. 2. When the process runs two or more threads, each thread executes the visit procedure. The number of threads, n, may be preset (or predetermined) within the system, e.g., by a user. The process runs in parallel on multiple threads on multiple cores. If a single thread is executing, there cannot be any collision. When there is no collision, the characteristic function f of the WCCs of the graph resulting from this processing is complete and correct.

Figure 2:
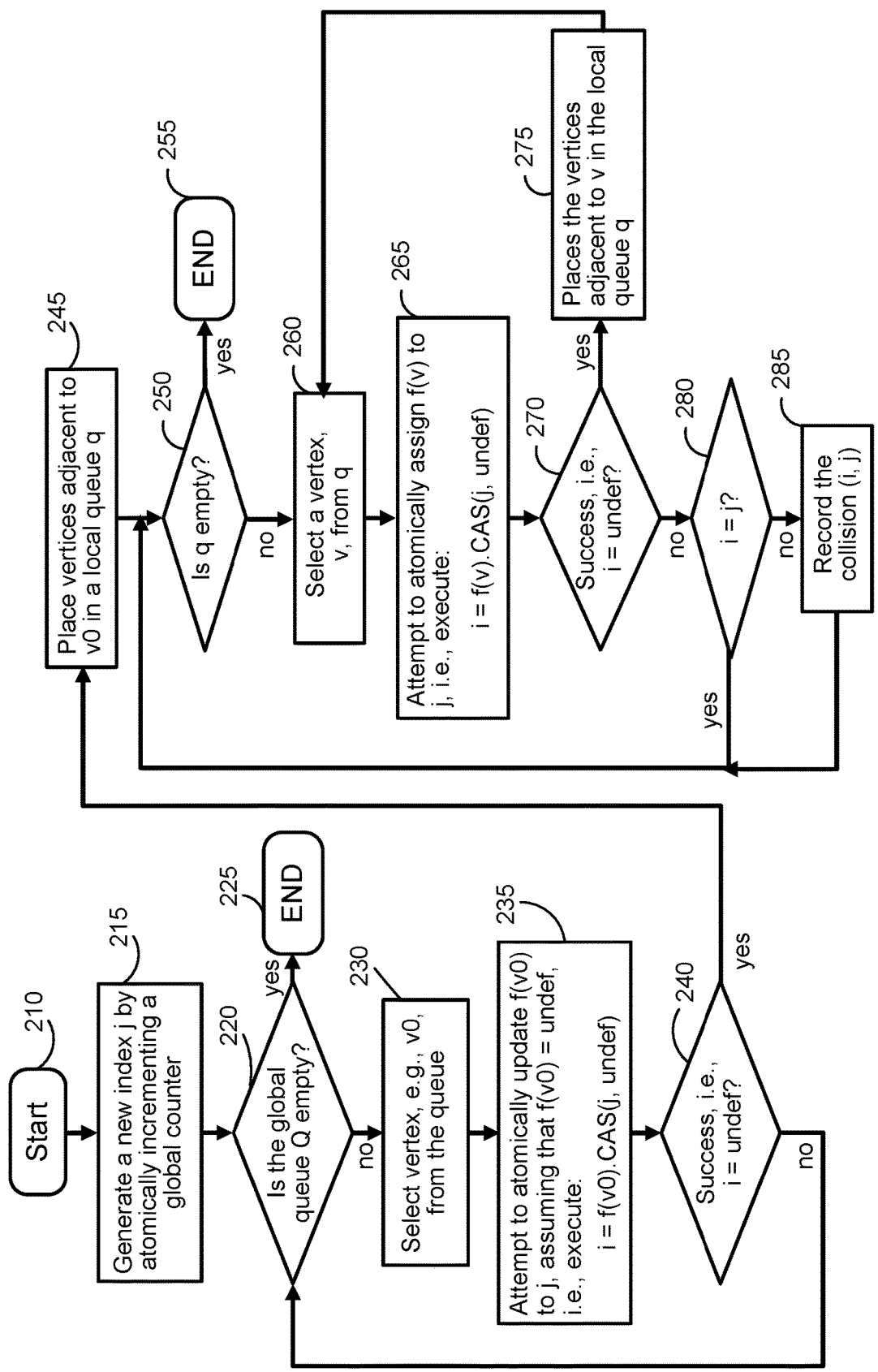
FIG. 2 depicts an example of a visit process in accordance with an example embodiment.

Referring to FIG. 2, it illustrates an example "visit" procedure according to an embodiment. In this figure, the process starts 210 with t0 as a thread running a procedure. The process generates 215 a new index, j, (WCCID, for WCC index) by incrementing a shared atomic counter. The atomic counter allows for multiple threads to read and increment this counter without producing inconsistencies. Because the counter is atomic, index j is guaranteed to be sound (as multiple threads may increment the shared counter) and unique to thread t0. The process determines 220 whether the global queue, Q, is empty. If the global queue, Q, is empty, it means all vertices in Q were visited and the process ends 225.

If the process determines the queue, Q, is not empty, thread t0 removes 230 a vertex, e.g., v0, from the queue.

Then the process attempts 235 to atomically assign f(v0) with the value j, assuming that f(v)=undef. Namely, it performs the instruction i=f(v0).CAS(j, undef). The process determines 240 whether the attempt succeeds (i.e., the assigned variable i is such that i=undef).

If the process determines 240 that the attempt failed because f(v0) has already been assigned to some index i (with i undef), this means some thread has already processed v0. The process then goes back 220 to select another vertex from the global queue.

If the process determines 240 that the attempt succeeded (i.e., the assigned variable i is such that i=undef), the process performs a dfs starting from vertex v0. The process places 245 the vertices adjacent to v0 is a local queue, q. The local queue, q, is local to the thread, i.e., it is only accessible by that thread.

The process determines 250 whether the local queue, q, is empty. If the local queue, q, is empty, the process ends 255. If the process determines 250 that the local queue, q, is not empty the process selects (i.e., removes) 260 a vertex, e.g., v, from the local queue. The process attempts 265 to atomically assign f(v) with the value j, assuming that f(v) =undef, i.e., it executes the instruction i=f(v).CAS(j, undef). The process determines 270 whether i=undef, which means success. If i=undef, meaning success, then the value of f(v) got changed from undef to j, and the dfs continues through the vertices adjacent to v. The process places 275 the vertices adjacent to the vertex, v, in the local queue, q, and then returns to selecting 260 another vertex from the local queue, q.

If the process determines 270 that the attempt failed because f(v) has already been assigned to some index i (with i≠undef), there may be two possible paths to follow. One path is if i=j, then vertex v has been assigned its WCCID (i.e., j) by the very same thread t0. This means there is no need to explore the vertices adjacent to v since t0 already performed that task. The other path is if i≠j, then another thread, e.g., t1, assigned the WCCID i to v. This means threads t0 and t1 collide in identifying the same WCC. The collision is registered as a pair (i, j), which means that the subsets referred to with index i (by thread t1) and j (by thread t0) are actually part of the same WCC and needs to be merged in a post process.

If the process does not determine 270 success, i.e., i≠undef, the process determines 280 whether i=j. If i=j the process returns to determining 250 whether the local queue is empty so that all vertices in the local queue, q, have been visited. If the process determines i≠j, the process records 285 the collision pair (i, j), as the vertices v whose value f(v) is i or j are actually part of the same WCC.

Because only one thread successfully changes the value of f(v) from undef to some value j (i.e., f(v) is written only once by some thread), it may be guaranteed that each vertex is processed only once.

Returning to FIG. 1, the process determines 125 whether there is at least one collision pair that has been recorded during the visitation of the vertices. The process is iterative for WCC determination on collision graphs. If some collisions have been recorded, the process defines 130 a collision graph G1=(V1, E1). In this graph, the set of vertices V1={0, 1, . . . , m} is the set of WCCID generated by the "visit" procedure and set of edges E1 is the set of collision pairs (i, j). The WCCIDs are generated with the shared atomic counter. By definition if m=w, then there is no collision (m being a maximum WCCID that has been generated by "visit" and w is the actual number of WCCs).

Graph G1 represents the graph of collisions on the WCC-IDs generated during the execution of the algorithm on the original graph G. Here, merging the WCCs of G that collide is equivalent to computing the WCCs on G1. That is, computing the WCCs on G1 is much less compute intensive than merging the (partial) WCCs on G because the later operates on the original graph G, which has way many more vertices and edges than G1. Thus, the same WCC computation algorithm may be applied on G1, which may produce a new collision graph G2, and that process may be iterated until there is no longer any collision. Once it is done, the set {0, 1, 2, . . . , m} has been partitioned into w sets S0, S1, . . . S_{w−1}, each set Sk being a subset of {0, 1, 2, . . . , m} that identifies one WCC of the original graph G.

To finally generate a deterministic characteristic function f (assuming a total order<on the vertices of G), each WCC (as represented by all the values in a Sk) is ordered using their minimum vertex; then each WCC, following their ordering, is assigned a WCCID in {0, 1, 2, . . . , w}. Computing the minimum vertex of each Sk can be done in a parallel manner, as well as the final assignment of f(v) for all vertices v.

Once there is a determination 125 that there is no collision, the WCCs of the collision graphs are merged 135, which finally determines the WCCs of the original graph. The process then ends 140.

Electronic Design Automation Configuration

Figure 3:
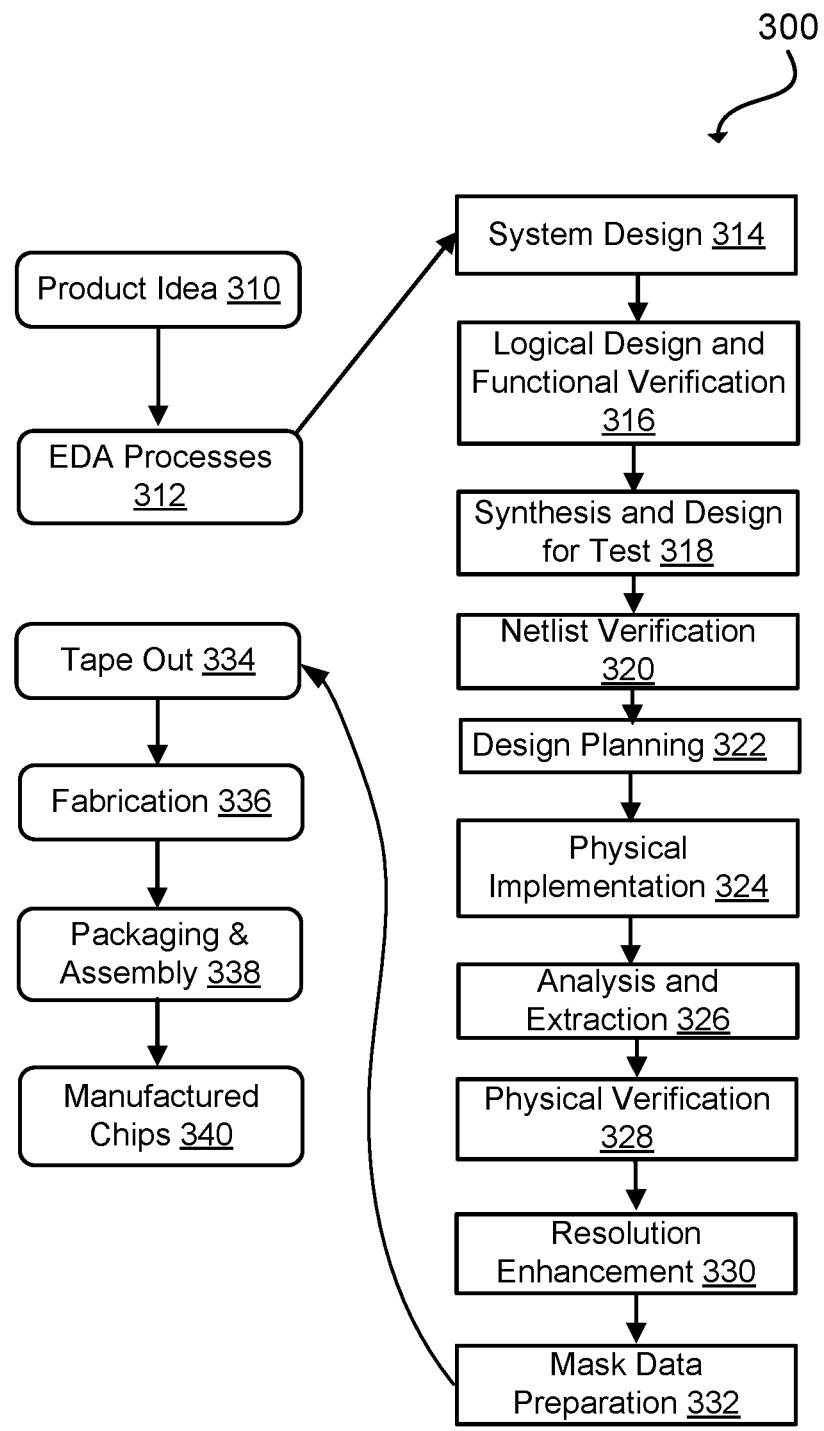
FIG. 3 depicts a flowchart of various processes used during the design and manufacture of an integrated circuit in accordance with some embodiments of the present disclosure.

FIG. 3 illustrates an example set of processes 300 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 310 with information supplied by a designer, information which is transformed to create an article of manufacture that uses a set of EDA processes 312. When the design is finalized, the design is taped-out 334, which is when artwork (e.g., geometric patterns) for the integrated circuit is sent to a fabrication facility to manufacture the mask set, which is then used to manufacture the integrated circuit. After tape-out, a semiconductor die is fabricated 336 and packaging and assembly processes 338 are performed to produce the finished integrated circuit 340.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 3. The processes described by be enabled by EDA products (or tools).

During system design 314, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 316, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 318, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 320, the netlist is checked for compliance with timing constraints and for correspondence with the HDL code. During design planning 322, an overall floor plan for the integrated circuit is constructed and analyzed for timing and top-level routing.

During layout or physical implementation 324, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 326, the circuit function is verified at the layout level, which permits refinement of the layout design. During physical verification 328, the layout design is checked to ensure that manufacturing constraints are correct, such as DRC constraints, electrical constraints, lithographic constraints, and that circuitry function matches the HDL design specification. During resolution enhancement 330, the geometry of the layout is transformed to improve how the circuit design is manufactured.

During tape-out, data is created to be used (after lithographic enhancements are applied if appropriate) for production of lithography masks. During mask data preparation 332, the 'tape-out' data is used to produce lithography masks that are used to produce finished integrated circuits.

A storage subsystem of a computer system (such as computer system 400 of FIG. 4) may be used to store the programs and data structures that are used by some or all of the EDA products described herein, and products used for development of cells for the library and for physical and logical design that use the library.

Example Computing or Machine Architecture

Figure 4:
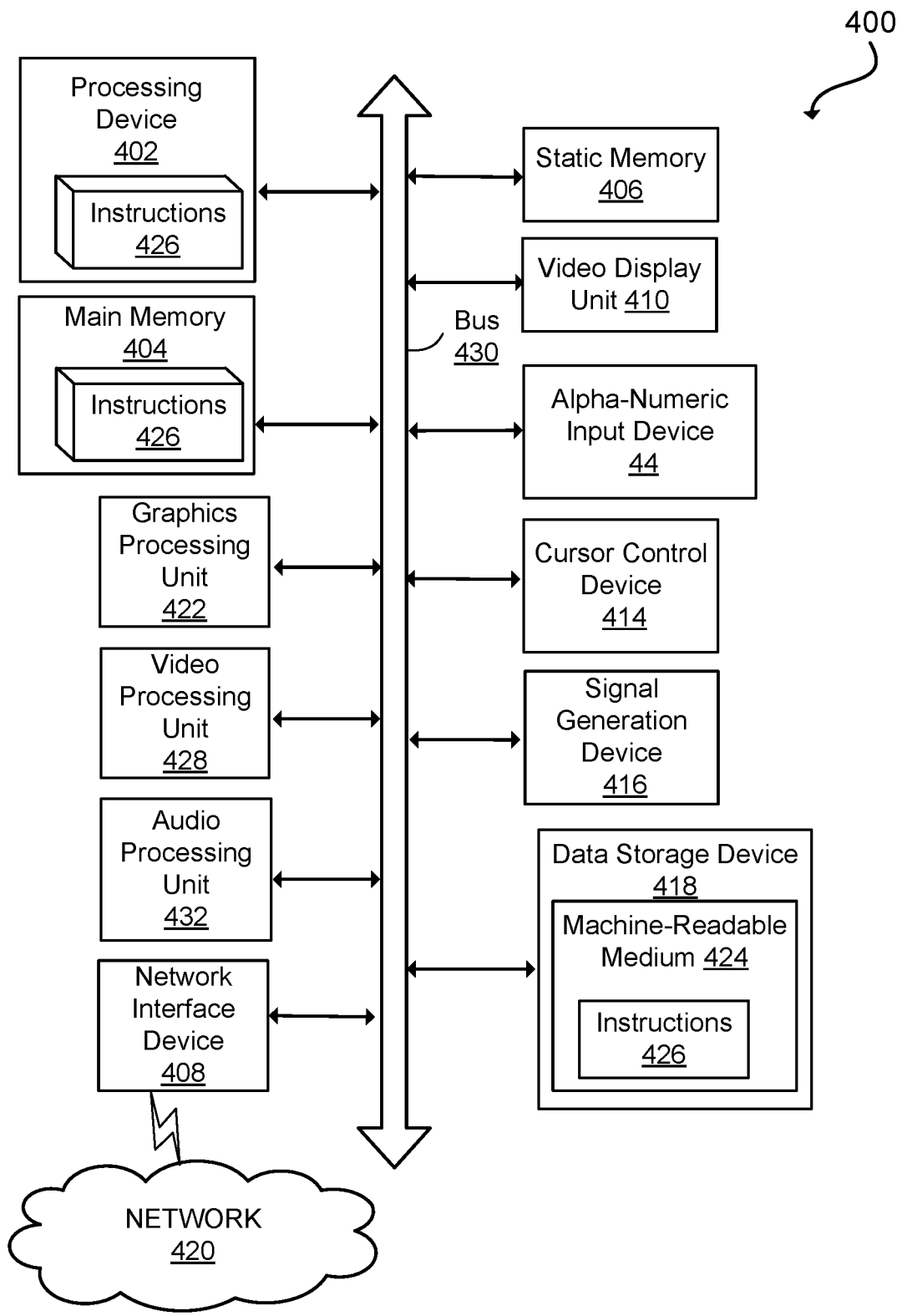
FIG. 4 depicts an abstract diagram of an example computer system in which embodiments of the present disclosure may operate.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing device 402 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device Z02 may be configured to execute instructions Z26 for performing the operations and steps described herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a non-transitory computer-readable medium) on which is stored one or more sets of instructions 426 or software embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In some implementations, the instructions 426 include instructions to implement functionality corresponding to the present disclosure. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer implemented method comprising:
    (a) receiving an undirected original graph having a plurality of vertices;
    (b) assigning an undefined value to each vertex of the plurality of vertices;
    (c) placing each vertex of the plurality of vertices in a global queue;
    (d) selecting, for each thread, a vertex from the global queue and visiting the vertices of a WCC that contains the selected vertex;
    (e) determining, for each thread, whether there is a collision at a visited vertex;
    (f) executing one of:
        merging the visited vertex into an existing weakly connected component (WCCs) for the thread in response to no collision, or
        generating a collision pair with the visited vertex in response to a collision;
    (g) collecting the collision pairs to generate a collision graph;
    iterating steps (a) through (g) to generate a new collision graph until the collision graph is empty due to no collisions determined; and
    merging, by a processor, the WCCs of the generated collision graphs to produce the WCCs of the original graph.

2. The method of claim 1, wherein, for each thread, visiting the vertices further comprises generating a new identifier (a WCCID) for a new WCC, the new identifier corresponding to an index value (j) that is unique to that thread.

3. The method of claim 2, further comprising for each thread:
    selecting a first vertex for which a value is undefined;
    assigning the value j to that first vertex; and performing a depth first search (dfs) beginning with the first vertex.

4. The method of claim 3, further comprising for each thread:
identifying an adjacent vertex from the first vertex;
determining whether the adjacent vertex has a value that is undefined; and
performing, in response to the determination, one of:
updating, atomically, the value of the adjacent vertex with the index value j in response to determination of the value being undefined; and
identifying a failure to write the index value j in response to the determination of the value of adjacent vertex being defined as a value i.

5. The method of claim 4, wherein updating, atomically, the value of the adjacent vertex further comprises obtaining the already defined value (i) through execution of an instruction compare-and-swap (CAS).

6. The method of claim 5, wherein identifying a failure further comprises:
determining no additional visits to adjacent vertices is required in response to the already defined value (i) being equal to the index value (j).

7. The method of claim 5, wherein identifying a failure further comprises:
identifying a collision at the adjacent vertex in response to the already defined value (i) not being equal to the index value (j); and
registering the already defined value (i) and the index value (j) as a collision pair (i, j).

8. The method of claim 2, wherein the index value is generated by incrementing a shared atomic counter.

9. A non-transitory computer readable storage medium comprising stored instructions, the instructions when executed causes a processor to:
(a) receive an undirected original graph having a plurality of vertices;
(b) assign an undefined value to each vertex of the plurality of vertices;
(c) place each vertex of the plurality of vertices in a global queue;
(d) select, for each thread, a vertex from the global queue and visit the vertices of a WCC that contains the selected vertex;
(e) determine, for each thread, whether there is a collision at a visited vertex;
(f) execute one of:
merge the visited vertex into an existing weakly connected component (WCCs) for the thread in response to no collision, or
generate a collision pair with the visited vertex in response to a collision;
(g) collect the collision pairs to generate a collision graph;
iterate steps (a) through (g) to generate a new collision graph until the collision graph is empty due to no collisions determined; and
merge the WCCs of the generated collision graphs to produce the WCCs of the original graph.

10. The non-transitory computer readable storage medium of claim 9, wherein the instructions to visit all of the vertices further comprises instructions to generate a new identifier (a WCCID) for a new WCC, the new identifier corresponding to an index value (j) that is unique to that thread.

11. The non-transitory computer readable storage medium of claim 10, further comprising instructions that when executed, for each thread, causes the processor to:
select a first vertex for which a value is undefined;
assign the value j to that first vertex; and
perform a depth first search (dfs) beginning with the first vertex.

12. The non-transitory computer readable storage medium of claim 11, further comprising instruction that when executed, for each thread, causes the processor to:
identify an adjacent vertex from the first vertex;
determine whether the adjacent vertex has a value that is undefined; and
perform, in response to the determination, one of:
update, atomically, the value of the adjacent vertex with the index value j in response to determination of the value being undefined; and
identify a failure to write the index value j in response to the determination of the value of adjacent vertex being defined as a value i.

13. The non-transitory computer readable storage medium of claim 12, wherein the instructions to update, atomically, the value of the adjacent vertex further comprises instructions that when executed causes the processor to obtain the already defined value (i) through execution of an instruction compare-and-swap (CAS).

14. The non-transitory computer readable storage medium of claim 12 wherein the instructions to identify a failure further comprises instructions that when executed causes the processor to determine no additional visits to adjacent vertices is required in response to the already defined value (i) being equal to the index value (j).

15. The non-transitory computer readable storage medium of claim 12, wherein the instructions to identify a failure further comprises instructions that when executed causes the processor to:
identify a collision at the adjacent vertex in response to the already defined value (i) not being equal to the index value (j); and
register the already defined value (i) and the index value (j) as a collision pair (i, j).

16. The non-transitory computer readable storage medium of claim 10, wherein the index value is generated by incrementing a shared atomic counter.

17. A computer implemented method comprising:
(a) receiving an undirected original graph having a plurality of vertices;
(b) assigning an undefined value to each vertex of the plurality of vertices;
(c) selecting, for each thread of a plurality of threads, a vertex and visiting the vertices of a WCC that contains the selected vertex;
(d) determining, for each thread of the plurality of threads, whether there is a collision at a visited vertex;
(e) executing one of:
merging the visited vertex into an existing weakly connected component (WCCs) for that thread in response to no collision, or
generating a collision pair with the visited vertex in response to a collision;
(f) collecting the collision pairs to generate a collision graph;
iterating steps (a) through (f) to generate a new collision graph until no collisions determined; and
merging, by a processor, the WCCs of the generated collision graphs to produce the WCCs of the original graph.

18. The method of claim 17, wherein, for each thread, visiting the vertices further comprises generating a new identifier (a WCCID) for a new WCC, the new identifier corresponding to an index value (j) that is unique to that thread.

19. The method of claim 18, further comprising for each thread:
   selecting a first vertex for which a value is undefined;
   assigning the value j to that first vertex; and
   performing a depth first search (dfs) beginning with the first vertex.

20. The method of claim 17, wherein new collision graphs are not generated in response the current collision graph being empty.

* * * * *